United States Patent [19]

Grussen

[11] 4,210,251
[45] Jul. 1, 1980

[54] ONE PIECE MOLDED SCREW-TYPE BOTTLE CAP

[76] Inventor: Jean Grussen, "La Noue" Mondreville 78114, Longnes, France

[21] Appl. No.: 906,668

[22] Filed: May 16, 1978

[30] Foreign Application Priority Data

May 20, 1977 [FR] France .................. 77 15581

[51] Int. Cl.² ........................................ B65D 41/34
[52] U.S. Cl. ................................. 215/329; 215/341; 215/DIG. 1; 53/488; 53/490; 264/296
[58] Field of Search ............... 215/252, 329, 341, 344, 215/DIG. 1; 53/487, 488, 490; 264/295, 296

[56] References Cited

U.S. PATENT DOCUMENTS

| 3,038,624 | 6/1962 | Wieckmann | 215/DIG. 1 |
| 3,441,161 | 4/1969 | Van Baarn | 215/252 |
| 3,980,195 | 9/1976 | Fillmore | 215/252 |
| 4,016,996 | 4/1977 | Aichinger et al. | 215/344 |

FOREIGN PATENT DOCUMENTS 1486721  5/1967  France .

Primary Examiner—Donald F. Norton
Attorney, Agent, or Firm—Brisebois & Kruger

[57] ABSTRACT

A one piece screw type bottle cap, a method of applying it and a method of molding it. The cap includes an internal sealing skirt having a cylindrical portion that seals against the internal surface of the bottle neck. The skirt flares inwardly and terminates at an outwardly extending collar which is bent upwardly before applying the cap to the bottle neck, and which engages the neck to form an additional seal only after the threads of the cap interengage with the threads of the neck.

5 Claims, 4 Drawing Figures

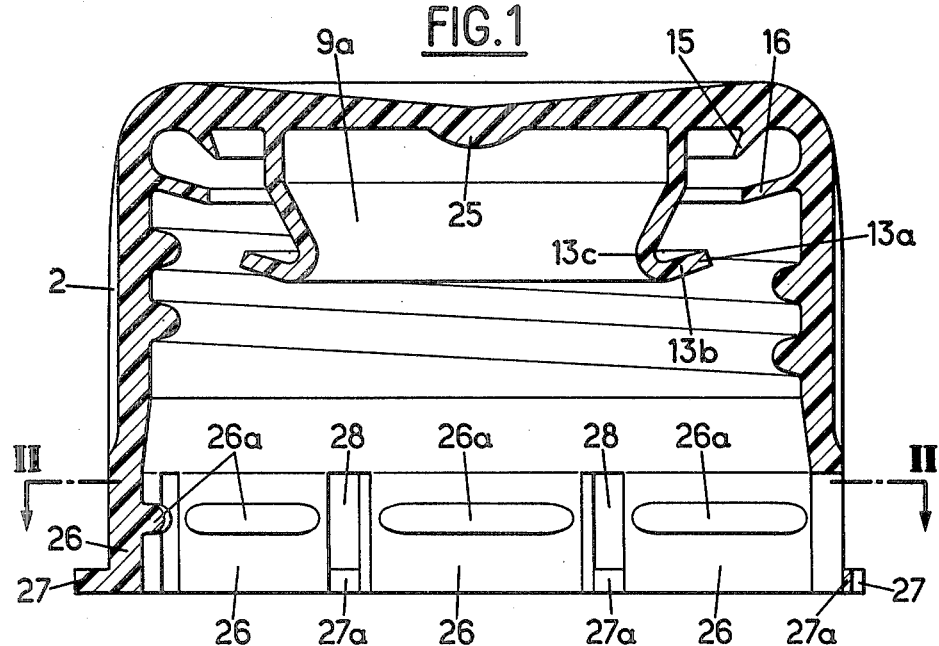
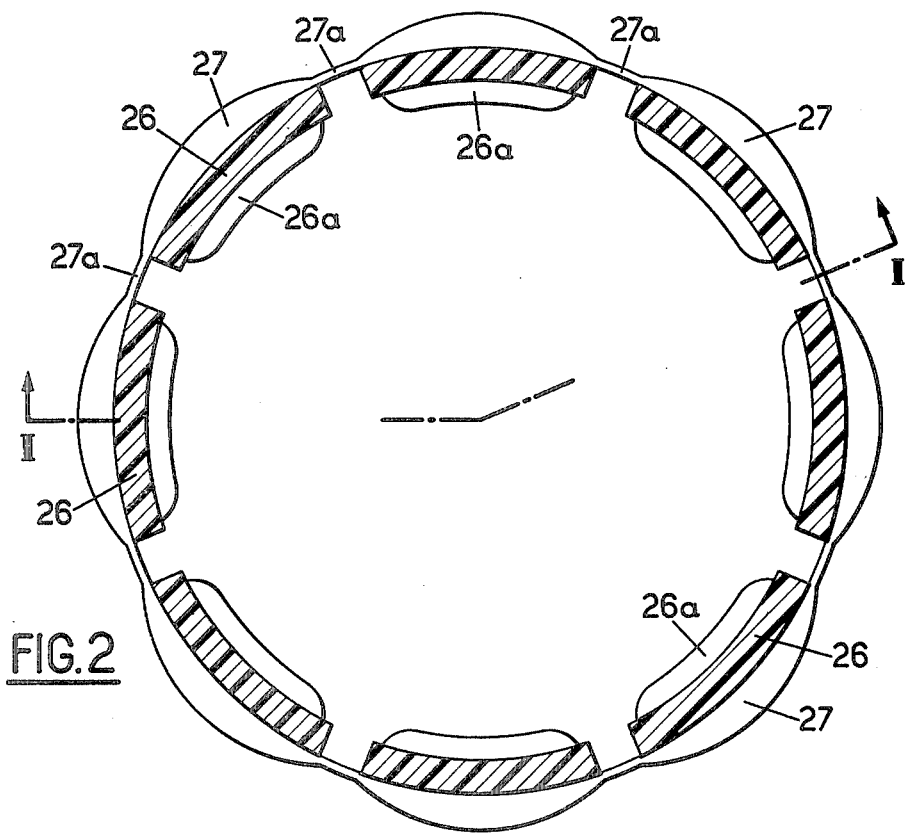

ONE PIECE MOLDED SCREW-TYPE BOTTLE CAP

In his copending application Ser. No. 764,069, now U.S. Pat. No. 4,090,631, the applicant has described a one-piece screw-type cap of semi-rigid plastic material, having a certain number of sealing lips provided to cooperate respectively with the upper outer part and the upper end section of a bottle neck having below this upper outer part, a helical thread, the cap comprising in addition an internal sealing skirt adapted to cooperate, after screwing of the cap, with the internal portion of the neck of the bottle at two distinct superimposed sealing zones, in which, a lower zone is made by folding back upwardly a lower peripheral molded collar of truncated form flaring out toward the base, and an upper zone is of essentially cylindrical shape.

The present invention has as an object an improved unmolding process using the mold described in the above patent, which enables the lower part of the internal sealing skirt of the cap to be folded back upwardly before finishing unmolding of this cap, in such a way that its distance from the top of the cap becomes sufficiently small that it is impossible to make this lower turned-up skirt penetrate inside the bottle neck, before screwing the cap and engaging its internal thread with the external thread of the bottle to be capped.

The invention also relates to the new cap thus obtained with an internal sealing skirt bent upward and of slight height, which can be obtained, either during molding by employing the unmolding process, or else by an operation after unmolding, preferably automatic, comprising the use of a swaging tool capable of insuring the folding back of the lower collar of the said internal skirt, and its piston which immobilizes the internal part of this skirt.

It is known that the reduction of total height of the internal sealing skirt of a screw-type cap avoids all risk of abrupt ejection after unscrewing under the effect of the pressure of gas contained in the bottle, and that this result is attained, regardless of the shape of the internal sealing skirt, and especially in the case of classical type internal skirts having an exterior cylindrical profile.

It is also known, that the same result can be obtained by progressively reducing the contact pressure between a bottle neck, and an internal sealing lip of the cap, during the unscrewing of the cap.

Also, numerous screw-type caps have already been made comprising an internal sealing skirt with lower collar of truncated shape flaring out toward the base, and able to be bent upward during the screwing of the caps.

However, there is every reason to observe that these latter caps do not always give complete satisfaction, because the forces required to be exerted on the lower collar of the internal sealing skirt during screwing, and which tend to cause its upward bending, are of such a nature as to cause deformations of this lower collar, which interfere with obtaining a correct final seal.

The new cap remedies these disadvantages, and is characterized especially, independent of the double sealing zone provided in the primary patent, by a previous folding back upwardly of the truncated lower collar of its inner sealing skirt, either during unmolding or, in all instances, before capping.

Tests by the applicant have demonstrated, that the internal skirt with a lower collar previously bent upwardly, would have, at the level of the collar, a clearly increased rigidity in relation to a skirt molded with its lower collar flaring out toward the base, and because of this increased rigidity, the twisting forces during screwing have minimal effect on this lower turned back collar, especially if the contact pressure is reduced sufficiently between this turned back collar and the inside of the bottle neck, by insuring a quasi-absolute seal at the level of the upper essentially cylindrical part of the internal sealing skirt, and of the two supplementary sealing lips provided to cooperate respectively with the upper end section, and with the upper outer rim of the bottle neck, above the external thread of the neck.

However there is every reason to state, that in spite of this reduced contact pressure between the lower turned up part of the internal sealing skirt and the inside of the neck of the bottle, this second sealing area significantly improves the sealing furnished by the said cap, particularly after pasturization of the contents of the bottle.

In fact, because of the semi-rigid character of the material used for such one-piece screw-type caps, the very high contact pressure which exists at the level of the upper essentially cylindrical part of the internal sealing skirt, diminishes appreciably during pasturization, as well as the effectiveness of the two already mentioned supplementary sealing lips, because of a permanent deformation of the semi-rigid material, which occurs because of the elevated temperature and of the severe constraints which are imposed on the cap, a deformation which is much more reduced at the level of the lower turned back collar, specifically as a result of the lower contact pressure at the level of the collar, and also from the small surface of the contact area between this collar and the inside of the neck of the bottle.

As a result, there still remains, after pasturization, at the level of the turned back collar, a spring effect sufficient to substantially limit the gas pressure acting on the upper seal, at the level of the essentially cylindrical part of the internal skirt.

The invention likewise relates to the addition, at the lower part of the cap, of a tamper-proof band with an external skirt and discontinuous retaining segments, including as is already known, between the various sections of the skirt and the segments, easily frangible connecting tabs, and which give the cap the tamper-proof character, the connecting tabs confining a lower part of small height of the tamper-proof band.

This tamper-proof band of known type, is characterized by the new embodiment, by the provision, at its lower part below the retaining segments, and at the level of the easily frangible connecting tabs, of an external horizontal collar having at the level of the different sections of the external skirt and the retaining segment, spaces of a radial width sufficient to permit constraining the lower external portion, both during the unmolding of the caps, and during the initial capping of the bottles to be sealed, so as to prevent all displacement outwardly of the connecting tabs of the external skirt, and which could cause the shearing off of these connecting tabs.

The mold, and the screw head used for initial capping, comprises for this purpose retaining shoulders which provide this radial immobilization, while permitting an expansion at the level of the retaining segments, and the spaces separating the thin sections.

It will be seen later on, in the description of the screw head used for initial capping, that this immobilizing collar, placed at a level lower than that of the retaining segments, causes, directly at the segments, the formation of a bulge corresponding to an expansion of the surface of the thin sections separated by the grooves.

In addition it is fitting to remark, that during the initial screwing of the cap, the forces acting on the elements of the retaining segments are directed downwardly, which favors the formation of the bulge, until the retaining segments are able to seat below the lower part of the neck ring of the bottle to be capped.

On the other hand it is understood, that during the initial unscrewing of the cap, the above-mentioned collar is no longer held fast, and that the tractive forces exerted on the retaining segments, and which tend to cause their expansion outwardly, necessarily cause the breaking off of the connecting tabs.

These characteristics of the present invention will be better understood by reading the description which follows of one embodiment of the new cap with an internal sealing skirt folded back upwardly before capping, and lower tamper-proof band comprising an immobilizing collar, and shown as a non-limiting example and described by referring to the attached drawings in which:

FIG. 1 is a section of the new cap according to line I—I of FIG. 2;

FIG. 2 is a horizontal section of this cap according to line II—II of FIG. 1;

Figure 3:
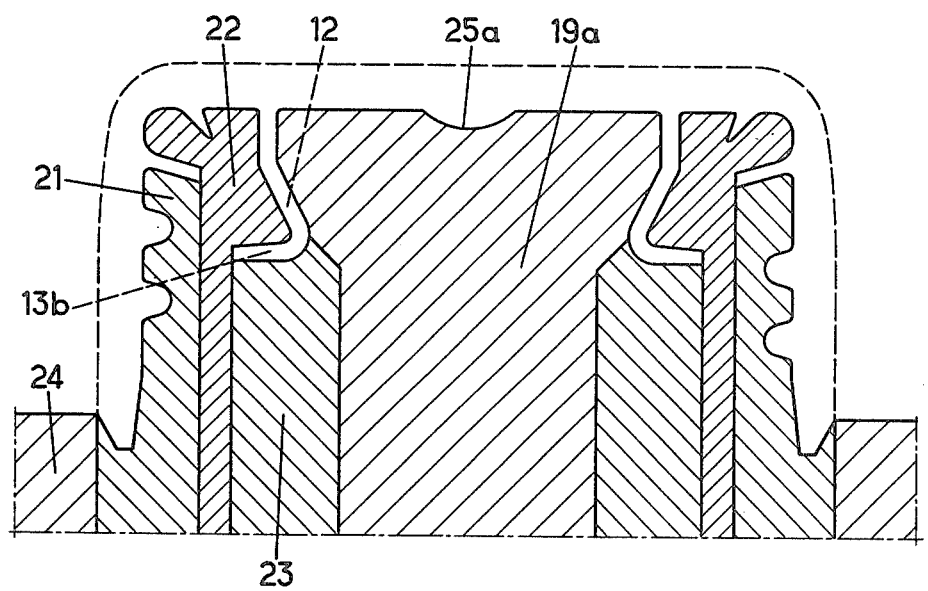
Figure 4:
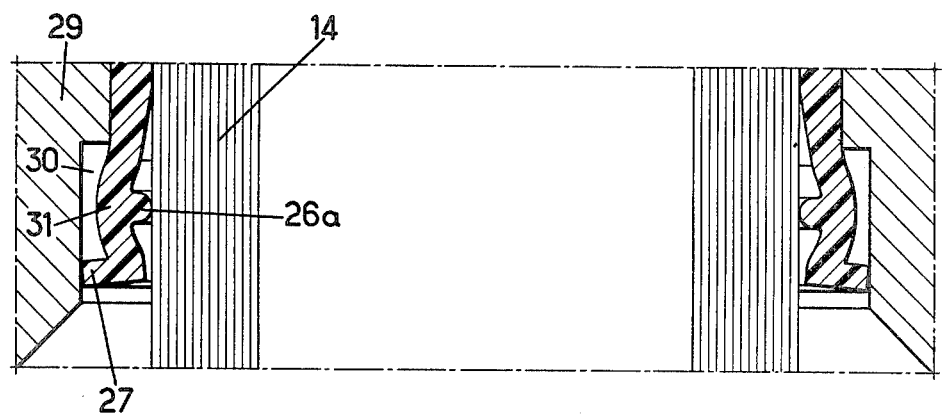

FIG. 3 is a schematic view of the mold, similar to FIG. 4 of U.S. Pat. No. 4,090,631, but comprising several modifications in detail of the central core 19; and, FIG. 4 is a section of the lower part of the screw head used to effect the initial capping, showing the retaining shoulder provided to receive the collar, and to prevent its outward expansion.

One finds in FIG. 1, the two sealing lips 16 and 15 like those of patent 4,090,631, provided to cooperate respectively with the upper part of the neck ring of the bottles to be capped, and to the flat end face of this ring.

The internal sealing skirt 9a of the cap differs from the sealing skirt 9 of the patent, in that its lower collar 13b is folded back upwardly before capping to reduce the distance from the head of the cap to its extremity 13a and to the part with minimum diameter 13c of the internal skirt 9a.

Also, projections 18 which were initially provided to facilitate unmolding, have been able to be omitted, and instead the central part of the top of the cap has been reinforced interiorly at 25.

Due to this folding back of the lower collar 13b before capping, effected preferably during removal of the cap from the mold, any possibility of contact between the collar 13b and the upper end of the neck of the bottle to be capped is avoided before the start of screwing of the cap and the engagement of the two threads, external and internal, respectively, provided on the bottle to be capped and on this cap.

As has been stated above, this characteristic avoids all danger of forceful ejection at the end of unscrewing the cap and enables the screwing of the cap to be carried out, without having to previously exert a pressure on this cap to set the lower collar 13b: the screwing of the cap is thus greatly facilitated.

In the embodiment illustrated by FIGS. 1 and 2, the lower part of the cap includes a tamper-resisting band constituted by a series of small strips 26 provided interiorly with retaining segments 26a, preferably occupying an angular sector slightly less than that taken up by a strip 26, and connected between themselves by a collar 27 having a scalloped profile and joining the small strips 26 at their lower part with connecting tabs 27a of slight thickness, and easily frangible, above which are openings 28 visible in particular in FIG. 1.

One of the tabs 27a is also visible at the right side of FIG. 1, on which can also be seen, behind the section plane, one of the scallops of the said collar 27.

As has been explained above, at the time of the first screwing of the cap, the compressive forces exerted on the retaining segments 26a, tend to create, at the level of the segments, a bulge, while collar 27 is held at its periphery, which prevents any expansion of the lower part of the cap, and any possibility of breaking off of the connecting tabs 27a.

On the other hand, during unscrewing, this collar can displace outwardly, and the tractive efforts acting on the retaining segments 26a tend to force the segments toward the exterior, generating tension forces on the connecting tabs 27a capable of causing them to break off.

FIG. 3 shows a central mold core 19a, no longer having openings 28 for projections, but having a central recess 25a enabling the above-mentioned reinforcement 25 of the end of the cap to be formed by the mold.

The other elements of the lower part of the mold are identical to elements 21 to 23 of FIG. 4 of U.S. Pat. No. 4,090,631. The same applies to ring 24 which encircles the lower part of the external element 21 of the mold.

It is well to remark however, that the mold shown in FIG. 3 of the drawings attached to the present application, is designed for molding of a cap not comprising, at its lower part, a tamper-resisting band.

In the case of molding of such a cap with a tamper-resisting band, the mold comprises, in addition to what has been stated above, a retaining ring for the lower collar 27, disposed in the lower part of the mold, and this mold is made to descend, as well as the molded cap, in relation to the matrix forming the upper part of the mold, in such a way as to allow, at the time of unscrewing of the external core 21, a deformation of the cap, thus forming a bulge at the level of the retaining segments 26a, between the lower part of this mold and the above-mentioned matrix forming the upper part of the mold.

The following is an explanation of the removal of the new cap from the mold, and the folding back upwardly of the lower collar 13b of its internal sealing skirt.

Upon completion of molding, the core element 23 is disengaged, by withdrawing it downwardly, then element 21 is unscrewed after having made the entire lower part of the mold descend, as is about to be explained, to a sufficient height to permit the formation of a bulge at the level of the retaining segments 26a, during the unscrewing of the element 21.

Then the core 22 is disengaged downwardly, which tends to cause the descent of lower collar 13b downwardly, but immediately after, this core 22 is pushed back upwardly, in such a way as to fold collar 13b upwardly against the conical part 12 of the internal skirt 9a, which supports itself against the upper part of the central core 19a, the core 22 being then finally withdrawn downwardly.

The central core 19a can then be withdrawn downwardly, and finally the cap is ejected from its mold, either by means of an ejector mounted in the upper part of the mold, or by means of compressed air.

It is well to remark, that the previous folding back process of the lower collar 13b, avoids any possibility of defective positioning of this collar inside bottle necks, and produces a very superior safety to that which can be obtained by using caps in which the lower part of the internal sealing skirt, comes in contact with the upper edge of the neck of the bottle to be capped, and is folded back, either by screwing of the cap, or by exerting a pressure on the cap before this screwing.

In FIG. 4, it can be seen that the screw head 29 has at its lower part, an opening 30 preventing any radial expansion of collar 27, and consequently, any shearing off of connecting tabs 27a.

It can be observed, that the opening 30 extends upwardly above the collar 27, in such a way as to permit the tamper-resistant band to distend, forming a bulge 31 above the collar 27 on both sides of the level of the retaining segments 26a which support themselves on the neck ring of the bottle to be capped.

Of course, the screw head contains internal flutes at its upper part which cooperate with flutes 2 of the cap, in a manner to permit screwing this cap by means of the head 29.

It is of course understood, that various changes, improvements or additions can be made to this embodiment which has just been described, and that certain elements can be replaced by equivalent elements, without changing, by so doing, the general scope of the invention.

I claim:

1. In a screw-type bottle cap molded in one piece from plastic material and comprising
   an internal sealing skirt depending from the top of said cap and adapted to be force-fitted into the externally threaded neck of a bottle,
   the improvement according to which said sealing skirt comprises a first substantially cylindrical portion adapted to engage in sealing contact with the internal surface of said neck,
   said first portion merging into a central inwardly flared portion terminating in an outwardly extending collar bent prior to applying the cap on the bottle neck from an initially downwardly extending position into an upwardly extending position in which the peripheral portion of said collar is such a distance from the top of the cap that it penetrates inside the bottle neck only after an internal thread of the cap engages with the external thread of the bottle neck and the cap is screwed, said peripheral portion forming an additional seal with the inner surface of said bottle neck as the cap is screwed down.

2. A method of applying a screw-type bottle cap molded in one piece from plastic material and of the type comprising
   an internal sealing skirt depending from the top of said cap and adapted to be force-fitted into the externally threaded neck of a bottle,
   said sealing skirt comprising a first substantially cylindrical portion adapted to engage in sealing contact with the internal surface of said neck, and
   said first portion merging into a central inwardly flared portion terminating in an outwardly extending collar bent prior to applying the cap on the bottle neck from an initially downwardly extending position into an upwardly extending position in which the peripheral portion of said collar is such a distance from the top of the cap that it penetrates inside the bottle neck only after an internal thread of the cap engages with the external thread of the bottle neck and the cap is screwed, said peripheral portion forming an additional seal with the inner surface of said bottle neck as the cap is screwed down;
   said method comprising the steps of
   engaging the threads of the cap with the threads of the bottle before engagement of the skirt with the inside of the bottle neck; and
   then engaging the skirt with the inside of the neck deforming the skirt to define both sealing zones by screwing the cap onto neck.

3. A method of making a screw-type bottle cap molded in one piece from plastic material and of the type comprising
   an internal sealing skirt depending from the top of said cap and adapted to be force-fitted into the externally threaded neck of a bottle,
   said sealing skirt comprising a first substantially cylindrical portion adapted to engage in sealing contact with the internal surface of said neck, and
   said first portion merging into a central inwardly flared portion terminating in an outwardly extending collar bent prior to applying the cap on the bottle neck from an initially downwardly extending position into an upwardly extending position in which the peripheral portion of said collar is such a distance from the top of the cap that it penetrates inside the bottle neck only after an internal thread of the cap engages with the external thread of the bottle neck and the cap is screwed, said peripheral portion forming an additional seal with the inner surface of said bottle neck as the cap is screwed down,
   said method comprising the steps of:
   molding said cap in a mold with said collar extending at least slightly downwardly relative to said cylindrical portion,
   moving relative to said cap at least the portion of the mold which forms said collar, and
   deforming said collar upwardly toward said cylindrical portion with a swaging tool to cause said collar to extend upwardly.

4. A method according to claim 3, wherein said step of molding the cap comprises molding the cap in a mold including
   a central core having a face defining an inner surface of said central inwardly flared portion; and
   an outer core having a face defining an outside surface of said inwardly flared portion, and
   said step of deforming said collar comprises,
   withdrawing said outer core, and
   then deforming the collar upwardly by using the outer core as a swaging tool.

5. A method according to claim 4 wherein said step of deforming further comprises deforming the collar upwardly against the outside surface of said inwardly flared portion while supporting the inner surface of said inwardly flared portion with said face of said central core.

* * * * *